US007418385B2

(12) United States Patent
Manabe et al.

(10) Patent No.: US 7,418,385 B2
(45) Date of Patent: Aug. 26, 2008

(54) VOICE DETECTION DEVICE

(75) Inventors: Hiroyuki Manabe, Yokosuka (JP);
Akira Hiraiwa, deceased, late of Yokohama (JP); by Yumiko Hiraiwa, legal representative, Yokohama (JP); Kouki Hayashi, Yokosuka (JP); Takashi Ninjouji, Yokohama (JP); Toshiaki Sugimura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 847 days.

(21) Appl. No.: 10/869,945

(22) Filed: Jun. 18, 2004

(65) Prior Publication Data

US 2005/0027529 A1 Feb. 3, 2005

(30) Foreign Application Priority Data

Jun. 20, 2003 (JP) .......................... P2003-176969

(51) Int. Cl.
*G10L 15/04* (2006.01)
(52) U.S. Cl. ...................... 704/254; 704/271; 704/249; 704/270; 704/243
(58) Field of Classification Search ................ 704/254, 704/241, 249, 271, 248, 233, 238, 270, 243
See application file for complete search history.

(56) References Cited

U.S. PATENT DOCUMENTS

| | | | | |
|---|---|---|---|---|
| 4,343,969 A | * | 8/1982 | Kellett | 704/254 |
| 4,401,851 A | * | 8/1983 | Nitta et al. | 704/248 |
| 4,769,844 A | * | 9/1988 | Fujimoto et al. | 704/248 |
| 4,937,870 A | * | 6/1990 | Bossemeyer, Jr. | 704/241 |
| 5,642,470 A | * | 6/1997 | Yamamoto et al. | 704/270 |
| 5,794,203 A | * | 8/1998 | Kehoe | 704/271 |
| 5,907,826 A | * | 5/1999 | Takagi | 704/251 |
| 5,966,690 A | * | 10/1999 | Fujita et al. | 704/233 |
| 6,343,269 B1 | * | 1/2002 | Harada et al. | 704/243 |
| 6,795,807 B1 | * | 9/2004 | Baraff | 704/271 |

(Continued)

FOREIGN PATENT DOCUMENTS

EP 1 341 159 A1 9/2003

(Continued)

OTHER PUBLICATIONS

Hudgins et al., ("A New Strategy for Multifunction Myoelectric Control," IEEE Transactions on Biomedical Engineering, vol. 40, No. 1, Hanuary 1993, pp. 82-94).*

(Continued)

*Primary Examiner*—Vijay B Chawan
(74) *Attorney, Agent, or Firm*—Oblon, Spivak, McClelland, Maier & Neustadt, P.C.

(57) ABSTRACT

This voice detection device is composed of a myoelectric signal acquisition part for acquiring, from a plurality of regions, myoelectric signals generated at the time of a vocalization operation, a parameter calculation part for calculating, as parameters, the fluctuations of the acquired myoelectric signals relative to a predetermined value in every channel corresponding to one of the plurality of regions, a vowel vocalization recognition part for specifying the vowel vocalization operation timing at the time of the vocalization operation, based on the fluctuations of the calculated parameters, and a vowel specification part for specifying a vowel corresponding to the vocalization operation, based on the fluctuation condition of the parameters before and after the specified vocalization operation timing in every channel.

9 Claims, 12 Drawing Sheets

U.S. PATENT DOCUMENTS 6,970,819 B1 * 11/2005 Tabei .................... 704/256

FOREIGN PATENT DOCUMENTS

| JP | 52-112205 | 9/1977 |
| JP | 6-43897 | 2/1994 |
| JP | 7-181888 | 7/1995 |

OTHER PUBLICATIONS

Watson et al., ("Statistical Analyses of Electromyographic Activity in Spasmodic Dysphonic and Normal Control Subjects," Journal of Voice, vol. 9, No. 1 1995, pp. 3-15).*

Noboru Sugie, et al., A Speech Prosthesis Employing a Speech Synthesizer-Vowel Discrimination from Perioral Muscle Activities and Vowel Production, IEEE Transactions on Biomedical Engineering, vol. BME-32, No. 7, Jul. 1985, pp. 485-490.

Hiroyuki Manabe, et al., "Non-phonation voice recognition using myoelectric signals", Interaction 2002 Collected Papers, 2002, pp. 181-182.

Hiroyuki Manabe, et al., "Unvoiced Speech Recognition using EMG -Mime Speech Recognition-", CHI 2003: New Horizons, Conference on Human Factors in Computing Systems, XP-002375973, Apr. 5, 2003, pp. 794-795.

A. D. C. Chan, et al., "Hidden Markov Model Classification of Myoelectric Signals in Speech", 2001 Proceedings of the 23rd Annual EMBS International Conference, XP-010594764, vol. 1 of 4, conf. 23, Oct. 25, 2001, pp. 1727-1730.

* cited by examiner

| PROXIMATE VOWEL COMPONENT | THRESHOLD | | |
|---|---|---|---|
| | CHANNEL 1 | CHANNEL 2 | CHANNEL 3 |
| /a/ | 0.5 | 0.2 | 0.1 |
| /i/ | ... | ... | ... |
| /u/ | ... | ... | ... |
| /e/ | ... | ... | ... |
| /o/ | ... | ... | ... |

| | | RECOGNITION RESULT | | | | |
|---|---|---|---|---|---|---|
| | | /a/ | /i/ | /u/ | /e/ | /o/ |
| IMMEDIATELY PRECEDING VOWEL COMPONENT | /a/ | — | EQL | INC | EQL | INC |
| | /i/ | EQL | — | INC | EQL | INC |
| | /u/ | DEC | DEC | — | DEC | EQL |
| | /e/ | EQL | EQL | INC | — | INC |
| | /o/ | DEC | DEC | EQL | DEC | — |

Fig.9B

| | | RECOGNITION RESULT | | | | |
|---|---|---|---|---|---|---|
| | | /a/ | /i/ | /u/ | /e/ | /o/ |
| IMMEDIATELY PRECEDING VOWEL COMPONENT | /a/ | — | INC | EQL | EQL | EQL |
| | /i/ | DEC | — | DEC | DEC | DEC |
| | /u/ | EQL | INC | — | EQL | EQL |
| | /e/ | EQL | INC | EQL | — | EQL |
| | /o/ | EQL | INC | EQL | EQL | — |

Fig.9C

| | | RECOGNITION RESULT | | | | |
|---|---|---|---|---|---|---|
| | | /a/ | /i/ | /u/ | /e/ | /o/ |
| IMMEDIATELY PRECEDING VOWEL COMPONENT | /a/ | — | DEC | DEC | INC | INC |
| | /i/ | INC | — | EQL | SIG INC | INC |
| | /u/ | INC | EQL | — | SIG INC | INC |
| | /e/ | DEC | DEC | DEC | — | EQL |
| | /o/ | DEC | DEC | DEC | EQL | — |

|  |  | RECOGNITION RESULT | | | | |
|---|---|---|---|---|---|---|
|  |  | /a/ | /i/ | /u/ | /e/ | /o/ |
| IMMEDIATELY PRECEDING VOWEL COMPONENT | /a/ | EQL | EQL | INC | EQL | INC |
|  | /i/ | EQL | EQL | INC | EQL | INC |
|  | /u/ | DEC | DEC | EQL | DEC | EQL |
|  | /e/ | EQL | EQL | INC | EQL | INC |
|  | /o/ | DEC | DEC | EQL | DEC | EQL |

Fig.11B

|  |  | RECOGNITION RESULT | | | | |
|---|---|---|---|---|---|---|
|  |  | /a/ | /i/ | /u/ | /e/ | /o/ |
| IMMEDIATELY PRECEDING VOWEL COMPONENT | /a/ | EQL | INC | EQL | EQL | EQL |
|  | /i/ | DEC | EQL | DEC | DEC | DEC |
|  | /u/ | EQL | INC | EQL | EQL | EQL |
|  | /e/ | EQL | INC | EQL | EQL | EQL |
|  | /o/ | EQL | INC | EQL | EQL | EQL |

Fig.11C

|  |  | RECOGNITION RESULT | | | | |
|---|---|---|---|---|---|---|
|  |  | /a/ | /i/ | /u/ | /e/ | /o/ |
| IMMEDIATELY PRECEDING VOWEL COMPONENT | /a/ | EQL | DEC | DEC | INC | INC |
|  | /i/ | INC | EQL | EQL | SIG INC | INC |
|  | /u/ | INC | EQL | EQL | SIG INC | INC |
|  | /e/ | DEC | DEC | DEC | EQL | EQL |
|  | /o/ | DEC | DEC | DEC | EQL | EQL |

Fig.12

VOICE DETECTION DEVICE

BACKGROUND OF THE INVENTION

1. Field of the Invention

The present invention relates to a voice detection device.

2. Related Background Art

In a voice detection device, there has hitherto been adopted a voice recognition technique in which a speech's voices are handled as acoustic signals and, by carrying out frequency analysis of the acoustic signals, voice information is recognized and processed. As an example of this voice recognition technique, a spectrum envelope or the like is employed. However, in order to yield a good voice detection result by the use of this voice recognition technique, a certain degree of sound volume was necessary at the time of speaking, and detection of the voice information was not possible unless acoustic signals from the speech were input. This, however, disturbs those around the speaker at the time of voice inputting, and hence it is substantially difficult to use such a voice detection device within offices or libraries, or various kinds of public institutions. Besides, there is a problem that in a circumstance where ambient noise is high, a problem of cross talks occurs and hence its voice detection function deteriorates.

Further, in mobile phones having been popularized rapidly in recent years, their users are now required to refrain from using them in trains. This is not only because of electromagnetic influences on electronic medical instruments such as a pace maker or the like at the time of using a mobile phone: A problem with bad behaviors is also pointed out in that one's speaking would turn into a noise disturbing those around him. As regards these problems associated with the acoustic signals, a study has heretofore been made to acquire speech information from something other than acoustic signals. This is because if one could acquire voice information from something other than acoustic information, it would become possible to speak without producing a voice sound.

As an example of this study, there is proposed a voice recognition procedure on the basis of visual information relating to lips (refer to the below-mentioned patent documents 1 and 2). The voice recognition procedures disclosed in the patent documents 1 and 2 specify lips' activities on the basis of image-processing using images picked up by a video camera or the like.

As another example of this study, there is proposed a voice recognition procedure to process myoelectric signals generated in association with perioral muscles activities so as to recognize a kind of a vowel being produced (refer to the below-mentioned non-patent document 1). The voice recognition procedure disclosed in the non-patent document 1 is to discriminate between five vowels (a, i, u, e, o) by counting the number of times a threshold crossing, after passing myoelectric signals through a bandpass filter.

As another example of this study, there is proposed a voice recognition procedure to process myoelectric signals from the perioral muscles using a neural network and detect not only vowels but also consonants (refer to the below-mentioned patent document 3).

As another example of this study, there is proposed a voice recognition procedure to recognize five vowels (a, i, u, e, o) using a root mean square of myoelectric signals at three locations of one's face (refer to below-mentioned non-patent document 2). For this recognition a neural network is used, and hence it is indicated that the recognition can be conducted with a high accuracy.

[Patent Document 1] Japanese Patent Application Provisional Publication No. 52-112205

[Patent Document 2] Japanese Patent Application Provisional Publication No. 6-43897

[Patent Document 3] Japanese Patent Application Provisional Publication No. 7-181888

[Non-Patent Document 1] Noboru Sugie et al., "A speech Employing a Speech Synthesizer Vowel Discrimination from Perioral Muscles Activities and Vowel Production, " IEE transactions on Biomedical Engineering, Vo. 32, No. 7

[Non-Patent Document 2] Manabe, Hiraiwa and Sugimura, "non-phonation voice recognition using myoelectric signals," Interaction 2002 Collected Papers, 2002, p. 181-182.

SUMMARY OF THE INVENTION

In a technique to perform a voice recognition based on myoelectric signals as described above, as with the voice recognition using usual speech signals, learning data to learn a recognition engine becomes necessary, and a vast amount of data will be required to enhance an accuracy of recognition.

It is therefore an object of the present invention to provide a voice detection device capable of performing a voice recognition without using learning data.

The inventors have examined, from various angles, a voice detection device capable of solving the above-mentioned problems. The inventors have paid attention to the processing with identification of vowels and identification of consonants being separated from each other. That is, since the voice recognition using myoelectric signals has an advantage of not being affected by ambient noise, as an auxiliary means for the voice recognition using usual speech signals, it is possible to use the recognition using myoelectric signals. In view of the above, in the present invention, notice has been taken of enabling the identification of vowels and from this view point, it has been attempted to realize the voice recognition. The present invention is implemented based on these knowledges.

A voice detection device according to this invention comprises myoelectric signal acquisition means to acquire, from a plurality of regions, myoelectric signals generated at the time of a vocalization operation; parameter calculation means to calculate, as parameters, fluctuations of the acquired myoelectric signals relative to a predetermined value for each channel corresponding to one of the plurality of regions; a vowel vocalization recognition means to specify a vocalization operation timing for a vowel at the time of the vocalization operation, based on the fluctuations of the calculated parameters; and a vowel specification means to specify a vowel corresponding to the vocalization operation, based on the fluctuation condition of the parameters in each channel before and after the specified vocalization operation timing.

In a voice detection device according to this invention, based on the fluctuation condition of the parameters before and after the vocalization operation timing specified based on the fluctuations of the parameters, a vowel corresponding to the vocalization operation is specified. Therefore, it is possible to specify a vowel based on the information as to the increase or decrease of the parameters. Therefore, if one can grasp the tendency of the fluctuations of the parameters, one can specify a vowel. Hence the voice recognition pertaining to the vowel becomes possible.

Further, a voice detection device according to this invention preferably further comprises myoelectric information storage means to store a combination of vowels before and after the vocalization operation timing and the fluctuation condition of the parameters, related to each other in each channel; and wherein the vowel specification means specifies the combination of vowels stored in the myoelectric information storage means, based on the fluctuation condition of the parameters so as to specify a vowel corresponding to the vocalization operation. Since the vowel specification means references the parameter fluctuation condition stored in the myoelectric information storage means and specifies a vowel matching the acquired parameter fluctuation condition, the voice recognition pertaining to the vowel becomes possible.

Further, in a voice detection device according to this invention, it is preferable that said parameters include a first parameter corresponding to a first time window and a second parameter corresponding to a second time window with a shorter time period than that of the first time window; the vowel vocalization recognition means specifies the vocalization operation timing based on the second parameter; and the vowel specification means specifies said vowel based on the first parameter. Since the vocalization operation timing is specified based on a second parameter corresponding to a second time window whose time period is set short, it becomes possible to specify the vocalization operation timing more appropriately.

A voice detection device according to this invention comprises a myoelectric signal acquisition means to acquire, from a plurality of regions, myoelectric signals generated at the time of a vocalization operation; a parameter calculation means to calculate, as parameters, fluctuations of the acquired myoelectric signals relative to a predetermined value in each channel corresponding to one of the plurality of regions; a fluctuation monitoring means to monitor whether or not the parameters would fluctuate over a predetermined time period; and a vowel specification means to specify a vowel corresponding to the vocalization operation, based on the monitoring result and the parameters.

In a voice detection device according to this invention, based on whether or not the parameters have fluctuated, one specifies a vowel corresponding to the vocalization operation. Hence one can specify a vowel by determining whether the parameters have increased or decreased. Therefore, one can specify a vowel by grasping the tendency of the parameter fluctuations. Hence the voice recognition pertaining to a vowel becomes possible.

Further, a voice detection device according to this invention preferably further comprises myoelectric information storage means to store a combination of vowels before and after the vocalization operation timing and a fluctuation condition of the parameter in a state where both are related to each other in each channel; wherein the vowel specification means adopts, if the parameters have not fluctuated over a predetermined time period, the parameter for the predetermined time period and, based on the fluctuation condition of the adopted parameter, specifies the combination of vowels stored in the myoelectric information storage means so as to specify a vowel corresponding to the vocalization operation. Since the vowel specification means references the parameter fluctuation condition stored in the myoelectric information storage means and specifies a vowel matching the acquired parameter fluctuation condition, the voice recognition pertaining to a vowel becomes possible.

BRIEF DESCRIPTION OF THE DRAWINGS

The present invention may be more readily described with reference to the accompanying drawings, in which.

DESCRIPTION OF THE PREFERRED EMBODIMENTS

The idea of the present invention will be easily understood with reference to the accompanying drawings prepared by way of example only and in connection with the detailed description hereinbelow. Subsequently, an embodiment of this invention will be described with reference to the accompanying drawings. If possible, same parts are designated with same reference numerals and overlapping descriptions are omitted.

Figure 1:
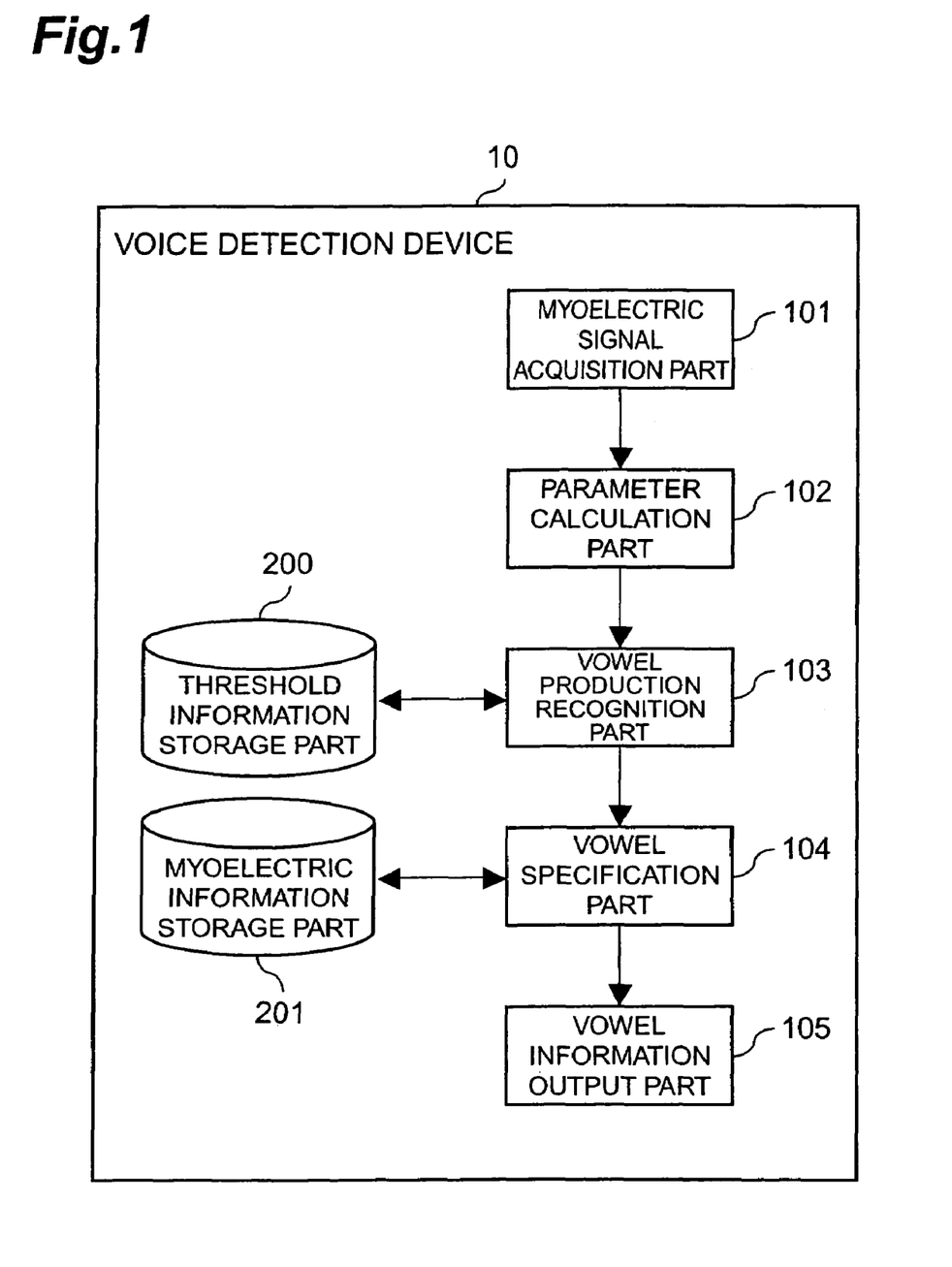
FIG. 1 is a view showing the structure of a voice detection device according to an embodiment of this invention.

Voice detecting device 10 according to the embodiment of this invention is now described with reference to FIG. 1. FIG. 1 is a block diagram illustrative of the voice detection device 10. Voice detection device 10 according to this embodiment is a non-phonation voice detection device, that is, a recognition device which recognizes a speaker's speech content performing a vocalization operation without producing a sound. Voice detection device 10 is physically so constituted as to comprise parts such as electrodes for acquiring myoelectric signals, CPU and memories. Voice detection device 10 comprises as functional components a myoelectric signal acquisition part 101 (myoelectric signal acquisition means), a parameter calculation part 102 (parameter calculation means), a vowel production recognition part 103 (vowel vocalization recognition means), a vowel specification part 104 (vowel specification means), a vowel information output part 105, a threshold information storage part 200, and a myoelectric information storage part 201 (myoelectric information storage means). Each component will now be described below.

Figure 2:
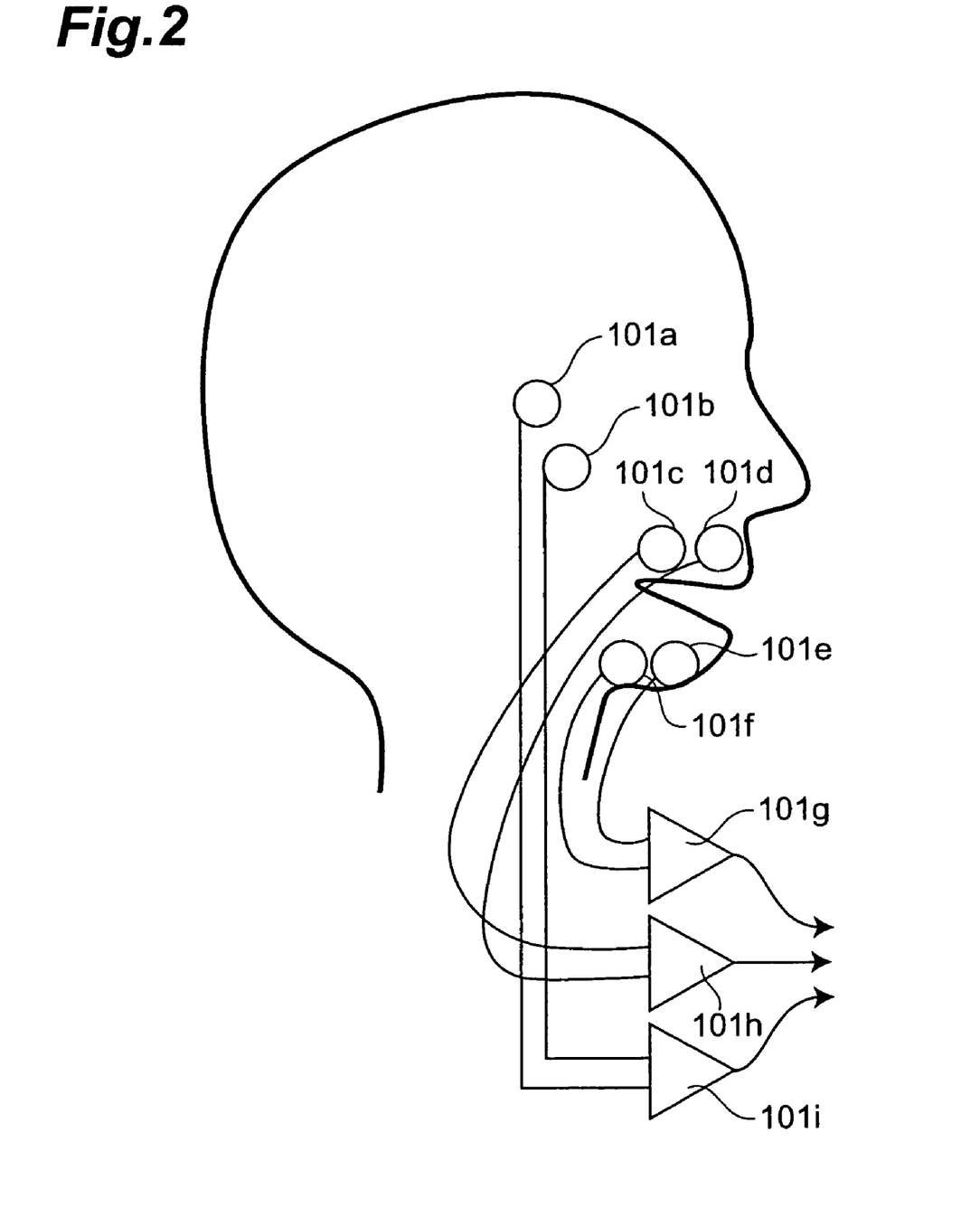
FIG. 2 is a view showing the structure of a myoelectric signal acquisition part of FIG. 1.

Myoelectric signal acquisition part 101 is a part for acquiring, from a plurality of regions, myoelectric signals generated at the time of a vocalization operation. Myoelectric signal acquisition part 101 outputs the acquired myoelectric signals to the parameter calculation part 102. The structure of the myoelectric signal acquisition part 101 is shown in FIG. 2. According to FIG. 2, the myoelectric signal acquisition part 101 is constituted by myoelectric signal measurement electrodes 101a-101f and amplifiers 101g-101i. According to the example of FIG. 2, the myoelectric signal measurement electrodes 101a and 101b acquire myoelectric signals generated from muscles corresponding to zygomaticus major and output these to the amplifier 101g. Amplifier 101g amplifies these myoelectric signals and output to the parameter calculation part 102. Further, the myoelectric signal measurement electrodes 101c and 101d acquire myoelectric signals generated from muscles corresponding to orbicularis oris and output to the amplifier 101h. Amplifier 101h amplifies these myoelectric signals and outputs to the parameter calculation part 102. Further, the myoelectric signal measurement electrodes 101e and 101f acquire myoelectric signals generated from muscles corresponding to digastricus output to the amplifier 101i. Amplifier 101i amplifies these myoelectric signals and output to the parameter calculation part 102.

Figure 3:
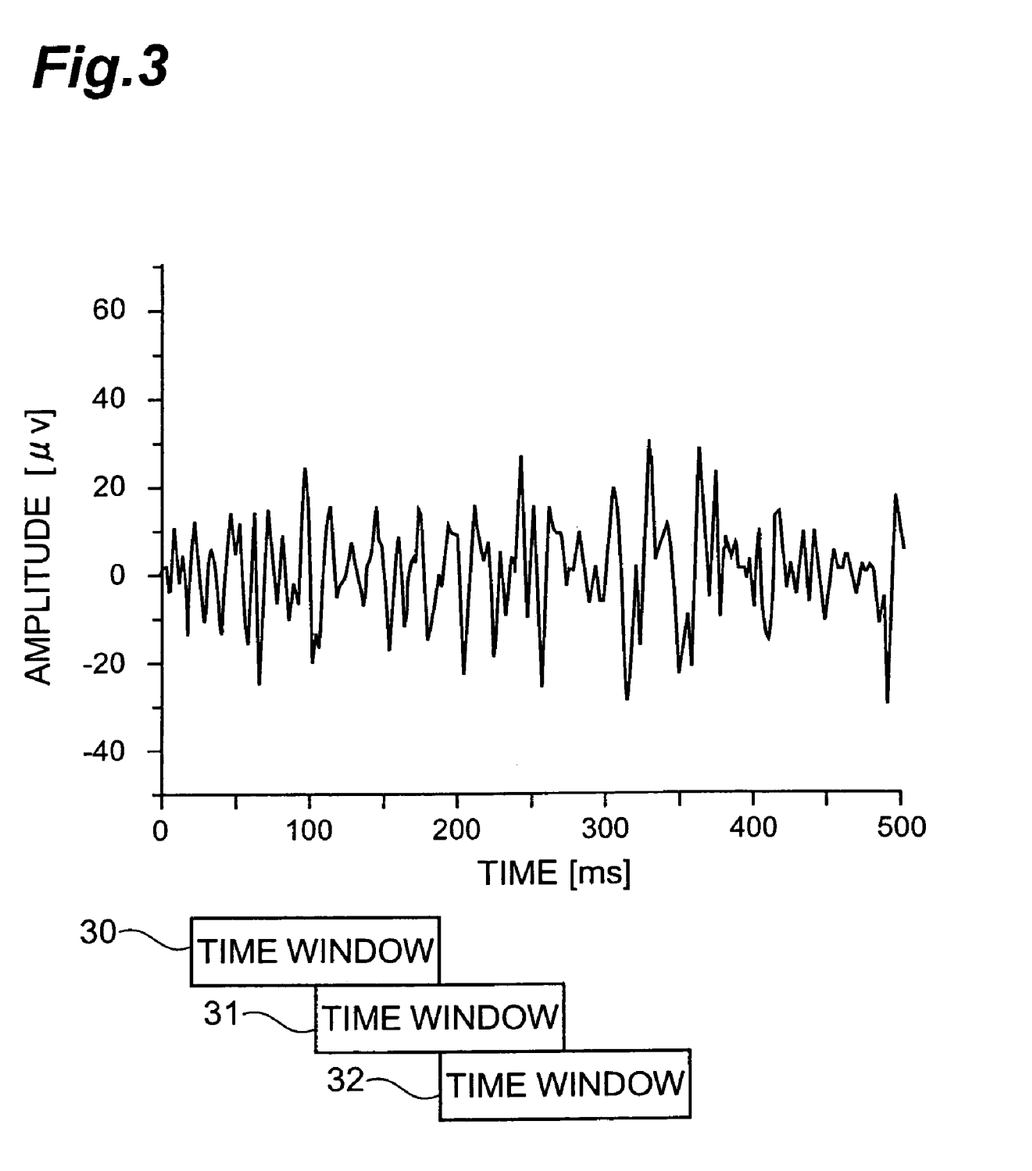
FIG. 3 is a view illustrating the operation of the parameter calculation part of FIG. 1.
Figure 4:
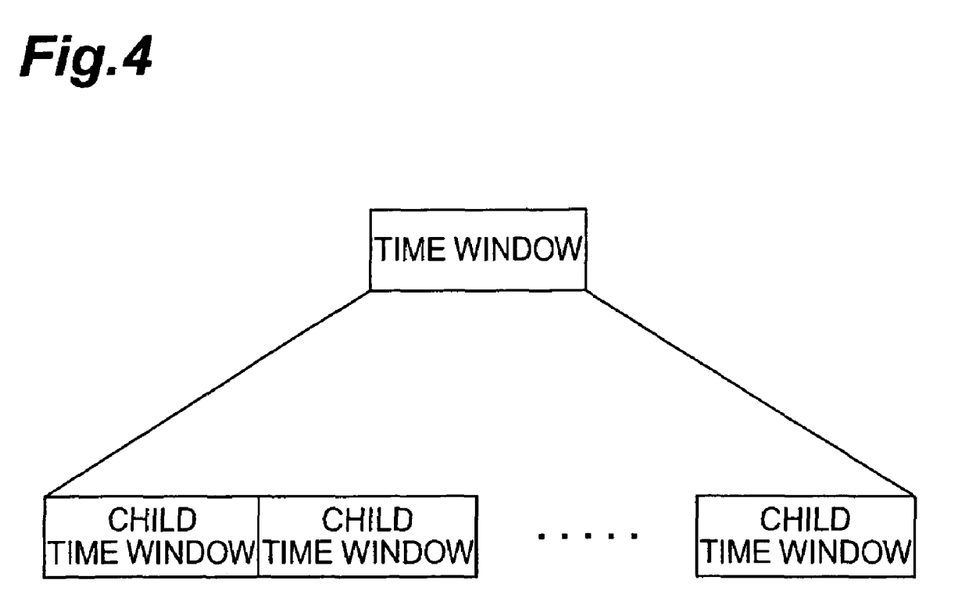
FIG. 4 is a view illustrating the operation of the parameter calculation part of FIG. 1.

Parameter calculation part 102 is a part for calculating, as parameters, fluctuations of myoelectric signals output from the myoelectric signal acquisition part 101 relative to a predetermined value for each channel corresponding to one of the regions. That is, the parameter calculation part 102 calculates the parameters for each of the myoelectric signals output from each amplifier 101g-101i of the myoelectric signal acquisition part 101. FIG. 3 is a depiction of a parameter calculation method of the parameter calculation part 102. Myoelectric signals output from the myoelectric signal acquisition part 101 can be represented by amplitudes of a time series of potentials as shown at the upper part of FIG. 3. Parameter calculation part 102 sequentially cut myoelectric signals output from the myoelectric signal acquisition part 101 out from time windows 30-32 (first time windows) with a predetermined time period. Here the predetermined time periods set at these time windows 30-32 are the same in length, and the disclosure times of the time windows 30-32 are set to be sequentially staggered. The lags of the disclosure times of the time windows 30-32 are arbitrary set, but, for example, the lags may be set to be equal to half the predetermined time.

Further, each time window 30-32 is so constituted as to include child time windows (second time windows). The predetermined times set at these child time windows are also arbitrary set. In this embodiment, the child time windows are set at 10-50 ms, and the time windows are set at 100 ms-500 ms. The utilization aspect of the parameters calculated from the time windows (first parameters) and the parameters calculated from the child time windows (second parameters) are described later.

Parameter calculation part 102 calculates, as parameters, a root means square (RMS) of myoelectric signals for each time window and each child time window. Here the root mean square is defined by the equation (1), where e (t) is a potential of a myoelectric signal. The root mean square calculated as this parameter can be handled as information relative to an activity amount of muscles.

[Eq. 1]

$$\sqrt{\frac{1}{2T}\int_{-T}^{T}e^2(t+\tau)d\tau} \quad (1)$$

Note that as another parameter associated with an activity amount of muscles, there is an average rectification value (ARV) of myoelectric signals, defined by the equation (2)

[Eq. 2]

$$\int_{-\infty}^{\infty}h(\tau)|e(t+\tau)|d\tau \quad (2)$$

Here, for the equation (2) the following equation (3) is defined.

[Eq. 3]

$$\int_{-\infty}^{\infty}h(\tau)d\tau = 1 \quad (3)$$

Further, as another parameter associated with an activity amount of muscles, there is an integral average of myoelectric signals (IEMG (integral myoelectrogram)), defined by the equation (4).

[Eq. 4]

$$\int_{T}^{T+\Delta\tau}|e(t+\tau)|d\tau \quad (4)$$

One may use any of the root mean square (RMS), the average rectification value (ARV), the integral electromyogram (IEMG) and a combination thereof. Further, one may use another parameter such as a frequency spectrum or the like. In this embodiment the root mean square is used.

Figure 5:
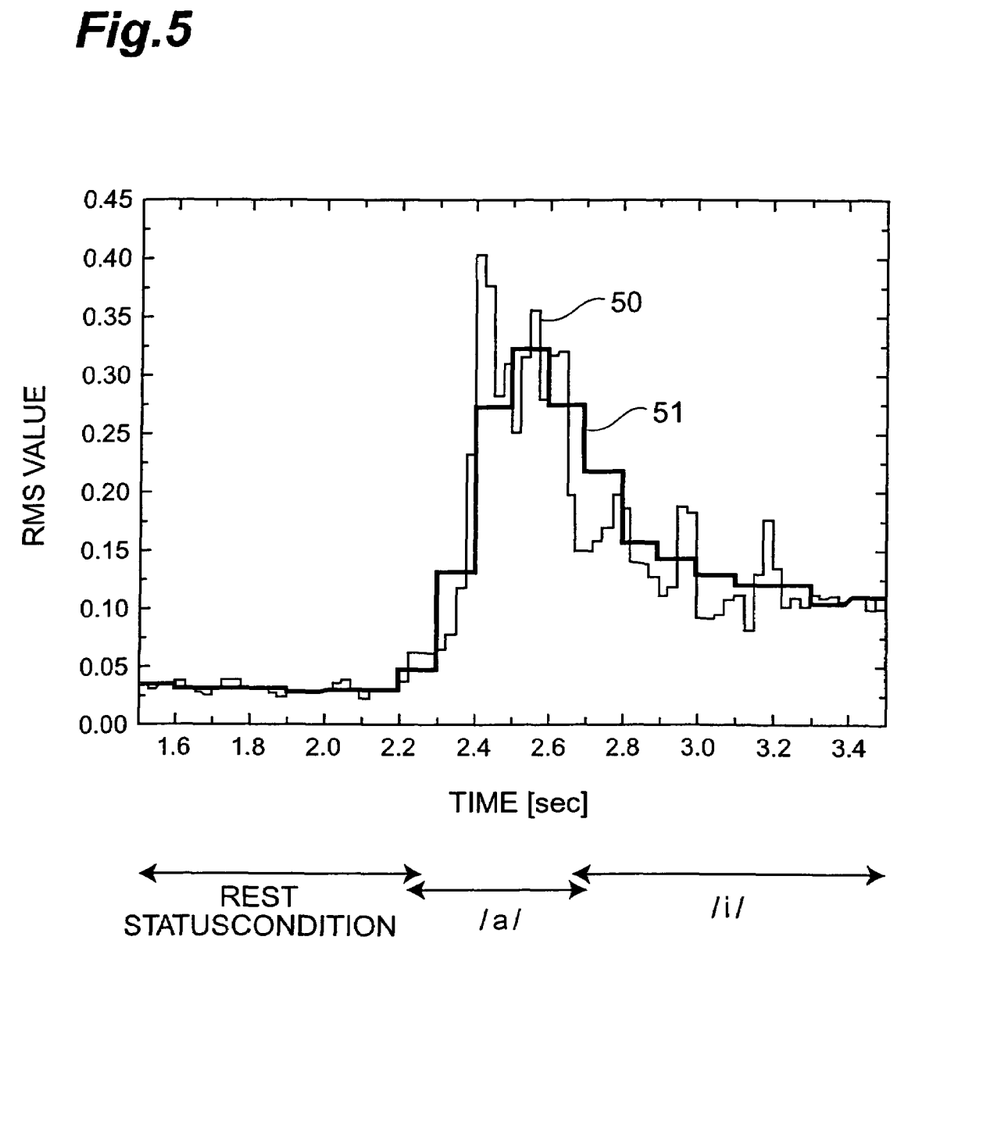
FIG. 5 is a view illustrating an example of the parameters calculated by the parameter calculation part of FIG. 1.

An example of a parameter calculated by the parameter calculation part 102 is shown in FIG. 5. FIG. 5 illustrates the root mean square values (RMS values) in a time series in the case of the vocalization of "/a/" from a rest condition and the subsequent vocalization of "/i/". Note that data 50 indicates a parameter (second parameter) at the child time window with a predetermined time being set at 50 ms, and data 51 indicates a parameter (second parameter) at the time window with a predetermined time being set at 200 ms. Note that in an example shown in FIG. 5 a cycle of the time window is set at 100 ms and a cycle of the child time window is set at 25 ms, so that a cycle of the change in the parameters are set at 100 ms and 25 ms, respectively. The method of processing data shown n FIG. 5 is described later. Parameter calculation part 102 outputs the parameters thus calculated to the vowel production recognition part 103.

Vowel production recognition part 103 is a part for specifying the vocalization operation timing of a vowel at the vocalization operation, based on the fluctuations of the parameters output from the parameter calculation part 102. The operation of the vowel production recognition part 103 is now described with reference to an example of data shown in FIG. 5. In FIG. 5, paying attention to data 50 of the child time window, one recognizes that a significant change in RMS value occurred at the part of 2.3-2.4 sec and at the part in the vicinity of 2.6 sec. Vowel production recognition part 103 specifies the timing of this change as the timing of the vocalization operation timing of a vowel and output to the vowel specification part 104 along with the parameters received from the parameter calculation part 102.

Figure 6:
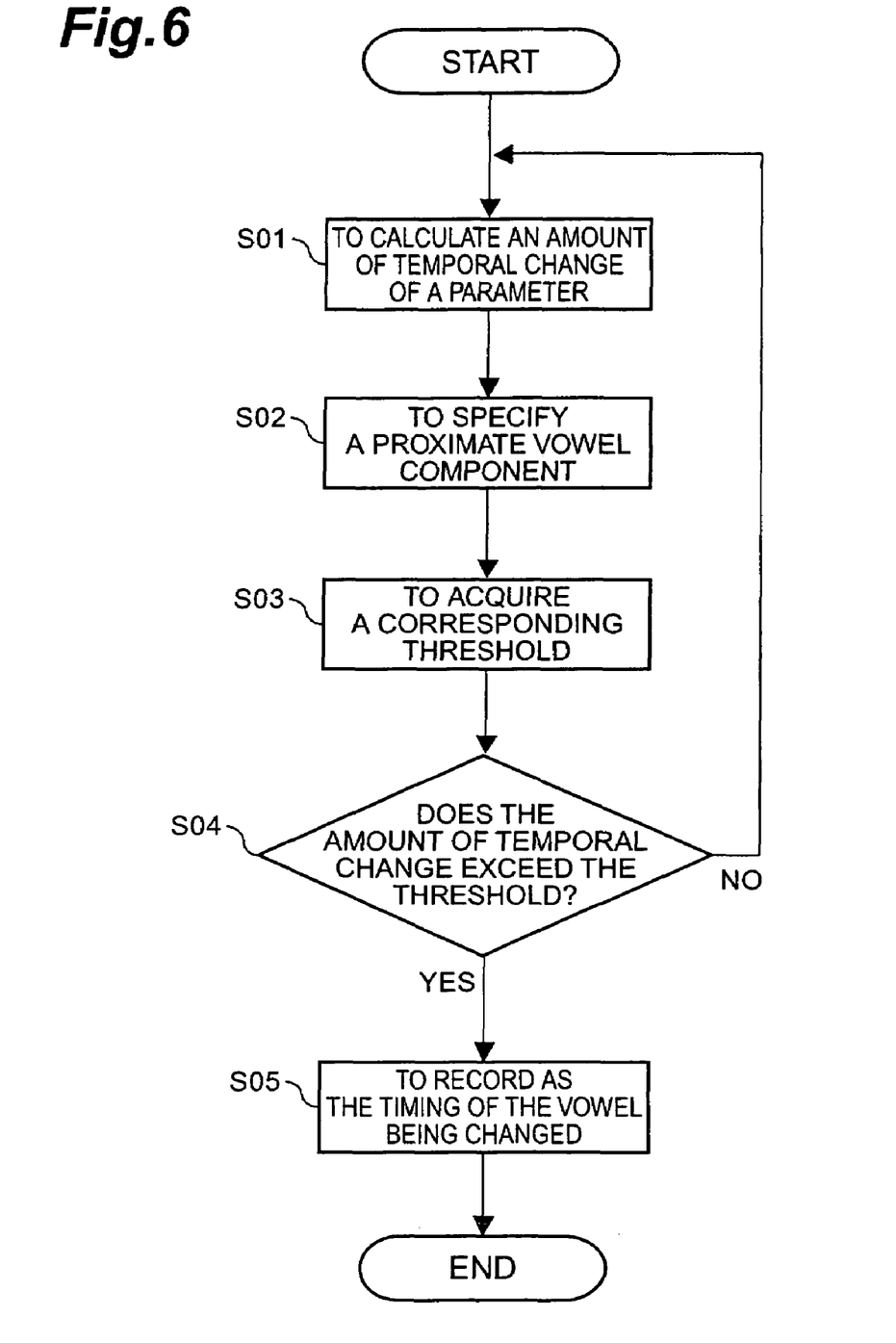
FIG. 6 is a view illustrating the operation of the vowel vocalization recognition part of FIG. 1.

Subsequently, a method in which the vowel production recognition part 103 detects a change in a parameter is now described in detail. FIG. 6 is a flow chart illustrating a method in which the vowel production recognition part 103 detects a change in a parameter. Vowel production recognition part 103 calculates an amount of temporal change in a parameter (step S01). An amount of temporal change P'(n) at the time $t_n$ is defined by the equation (5), where the calculated parameter is expressed as p ($t_n$).

[Eq. 5]

$$P'(n)=|P(t_{n+1})-P(t_n)| \quad (5)$$

Note that as a amount of temporal change P' (n) one may employ, as defined by the equation (6), the absolute value of the difference between the sum of the weighted parameters up to immediately before a predetermined time and the proximate parameter.

[Eg. 6]

$$P'(n) = \left| p(t_{n+1}) - \sum_{i=n-j}^{n} w_i p(t_i) \right| \quad (6)$$

Further, as a amount of temporal change P' (n) one may employ, as defined by the equation (7), the quotient of the absolute value of the difference between the sum of the weighted parameters up to immediately before a predetermined time and the proximate parameter divided by the value of the proximate parameter. In this case, the degree of a change in the value of the parameter is expressed by a ratio.

[Eq. 7]

$$P'(n) = \frac{\left| p(t_{n+1}) - \sum_{i=n-j}^{n} w_i p(t_i) \right|}{p(t_{n+1})} \quad (7)$$

As an amount of temporal change P' (n), which would be satisfactory if it could specify the degree of change of the proximate calculated parameter from the parameter calculated in the past, one may employ, instead of the absolute value as with the equations (5)-(7), the value of the difference itself.

Figure 7:
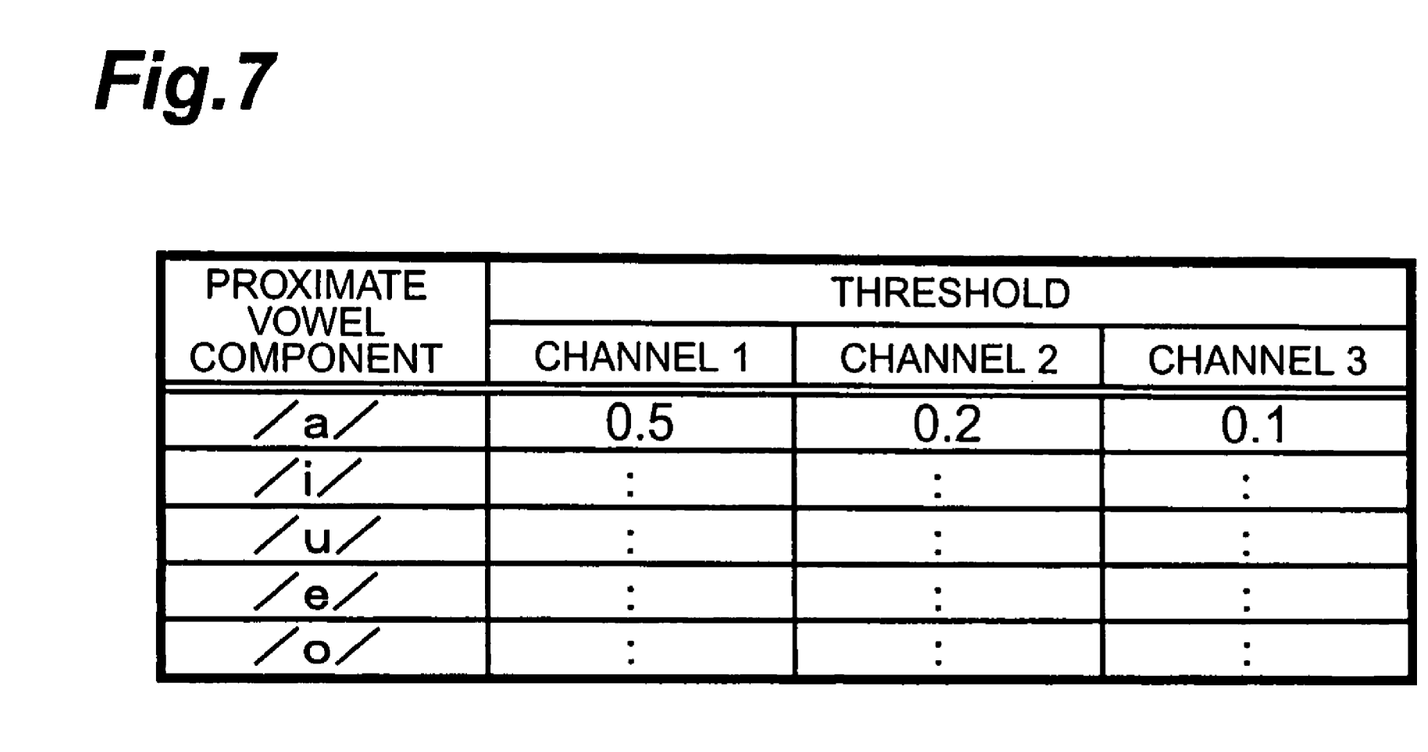
FIG. 7 is a view showing an example of the information stored in the threshold information storage part of FIG. 1.

Vowel production recognition part 103 specifies a vowel component vocalized proximately (S02). In this embodiment, the vowel component vocalized immediately before has already been recognized, and the vowel production recognition part 103 specifies this already recognized vowel component as the one vocalized proximately. As the procedure to recognize the vowel component vocalized immediately before, one can use a known voice recognition procedure. Further, for example, one may make it a rule to ask a user to initially pronounce "ah," and have the vocalized vowel component recognized. Vowel production recognition part 103 references, based on this specified vowel component, the information stored in the threshold information storage part 200 and acquires a corresponding threshold (step S03). As shown in FIG. 7, in the threshold information storage part 200, "proximate vowel components" and "thresholds" are stored, associated with each other. "Thresholds" are stored for each channel and, for example, if a "proximate vowel component" is "/a/", then a "threshold" is 0.5 for "channel 1", 0.2 for "channel 2" and 0.2 for "channel 3". The function of this "threshold" is similar to that of a "change characteristic" as described later, and the "threshold" corresponds to a short time window (child time window) and the "change characteristic" corresponds to a long time window.

Vowel production recognition part 103 determines whether or not the amount of temporal change calculated in step S01 exceeds the threshold acquired at step S01 in each channel (step S04). If the amount of temporal change exceeds the threshold in each channel at a certain time, the vowel production recognition part 103 records this time as the timing of a vowel being changed (step S05). If the amount of temporal change does not exceed the threshold, it returns to the process of step S01. Note that in case of determining an amount of temporal change exceeding a threshold, one may make it a condition that an amount of temporal change exceeds a threshold for all channels, that an amount of temporal change exceeds a threshold for a majority of the channels or that an amount of temporal change exceeds a threshold for one channel.

Figure 8:
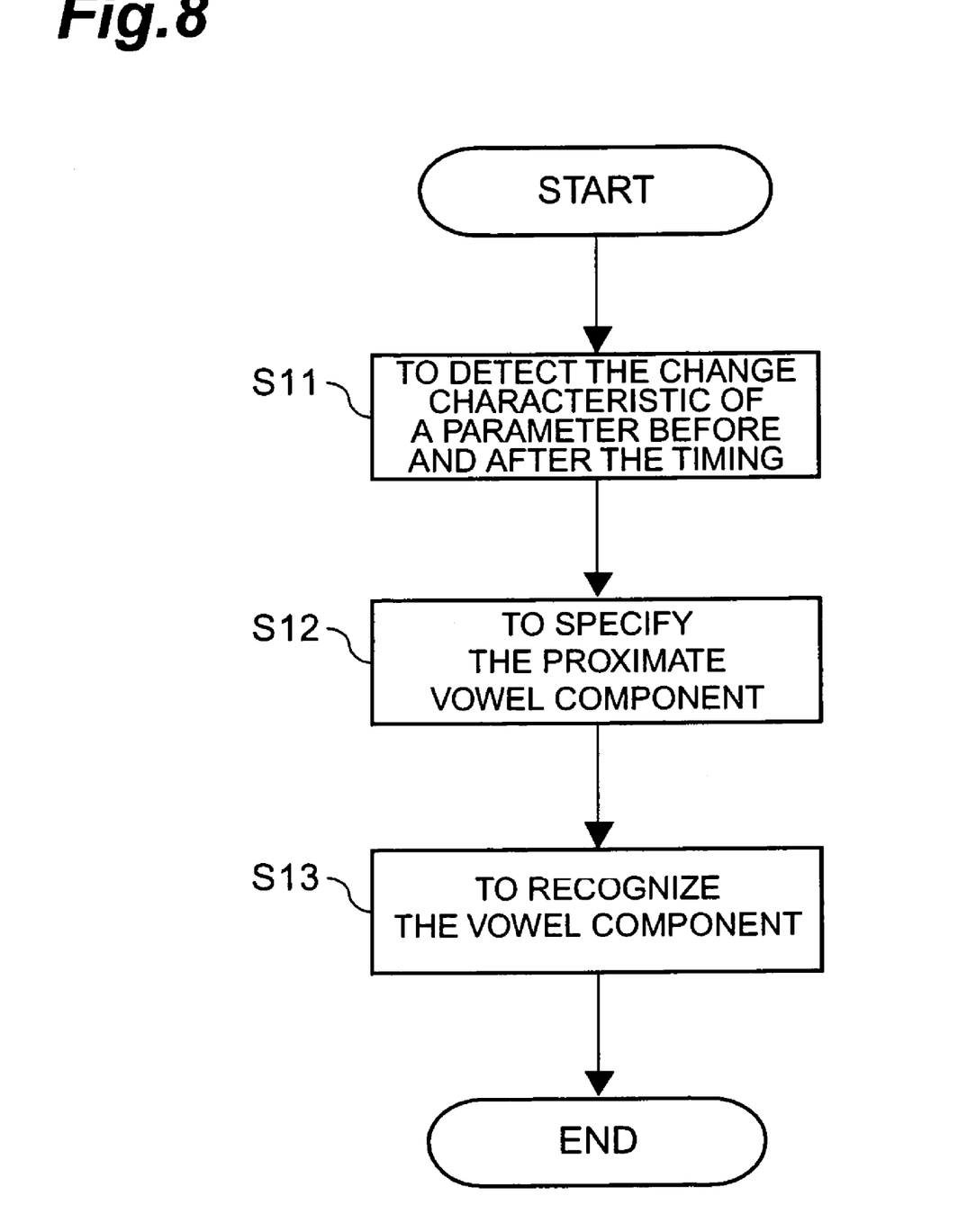
FIG. 8 is a view illustrating the operation of the vowel specification part of FIG. 1.

Returning to FIG. 1, the vowel production recognition part 103 outputs, along with the parameters output from the parameter calculation part 102, the timing of a vowel changing to the vowel specification part 104. Vowel specification part 104 is a part for specifying a vowel corresponding to a vocalization operation, based on the fluctuation condition of the parameters in each channel before and after the timing of a vowel changing output from the vowel production recognition part 103. A method in which the vowel specification part 104 specifies a vowel is now described with reference to FIG. 8. FIG. 8 is a flow chart illustrating a method in which the vowel specification part 104 specifies a vowel.

Vowel specification part 104 detects a change characteristic of a parameter before and after the timing of a vowel changing. This change characteristic is classified according to whether a parameter has increased significantly, increased, remained equal, or decreased before and after the timing of a vowel changing. More specifically, one determines the case of an increase of more than 200% from the preceding condition as a significant increase, the case of an increase not less than 50% to below 200% from the preceding condition as an increase, the case of a change less than ±50% from the preceding condition as equal, and the case of a decrease less than 50% from the preceding condition as a decrease. Explaining with the example of FIG. 5, as described above, the timing of a vowel changing is at the part of 2.3-2.4 sec and at the part in the vicinity of 2.6 sec. Looking at the data 51 of a time window set at a longer time period than that of a child time window for these parts, one can grasp its increase/decrease. Vowel specification part 104 detects this change characteristic for each channel.

Figure 9A:
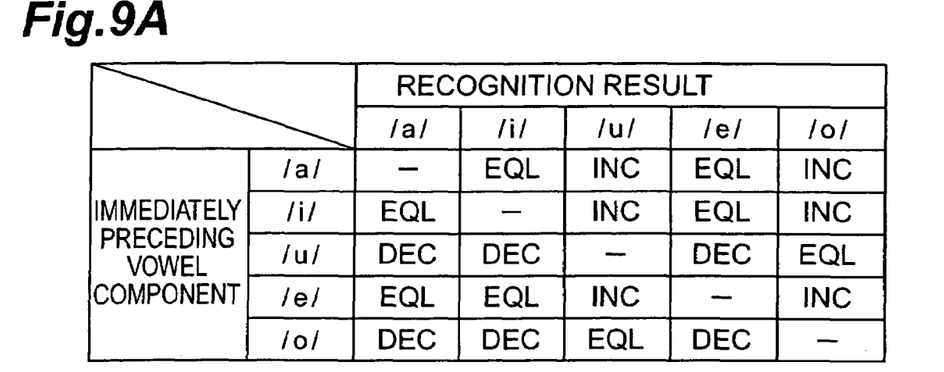
FIG. 9A is a view showing an example of the information stored in the myoelectric information storage part of FIG. 1.
Figure 9B:
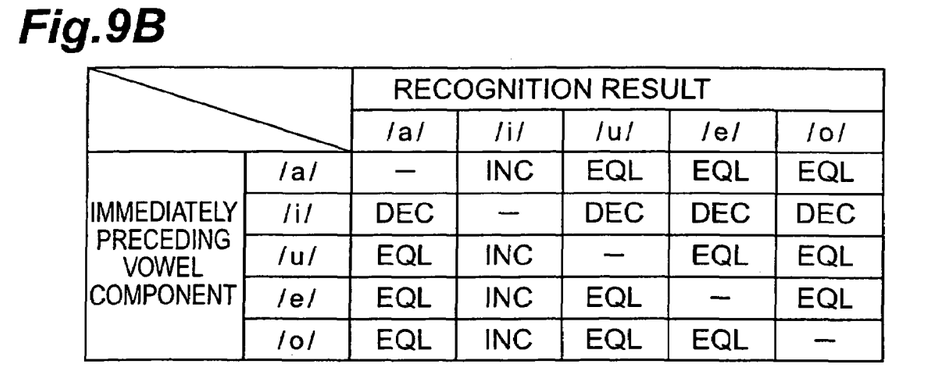
FIG. 9B is a view showing an example of the information stored in the myoelectric information storage part of FIG. 1.
Figure 9C:
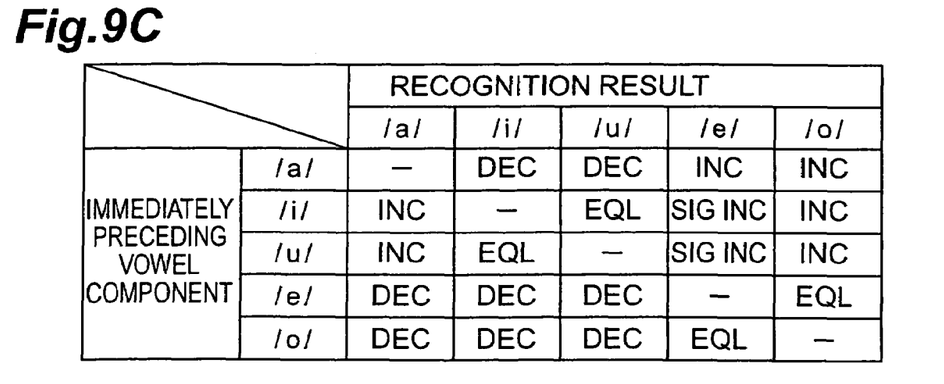
FIG. 9C is a view showing an example of the information stored in the myoelectric information storage part of FIG. 1.

Vowel specification part 104 specifies a vowel component being vocalized proximately (step S12). Vowel specification part 104 recognizes a vowel component upon a comparison of information stored in the myoelectric information storage part 201 and the change characteristic of each channel, based on this specified vowel component (step S13). An example of information stored in the myoelectric information storage part 201 is shown in FIGS. 9A-9C. FIG. 9A shows the correspondence between an immediately preceding vowel component at orbicularis oris and the change characteristic, FIG. 9B shows the correspondence between an immediately preceding vowel component at zygomaticus major and the change characteristic, and FIG. 9C shows the correspondence between an immediately preceding vowel component at digastricus and the change characteristic. For example, if the change characteristic for each channel is "equal" at orbicularis oris, "increase" at zygomaticus major, and "decrease" at digastricus, it recognizes, based on information shown in FIGS. 9A-9C, the vocalized vowel as "/i/". Note that in FIGS. 9A-9C "eql" means "equal", "dec" means "decrease", "inc" means "increase" and "sig inc" means "significant increase".

Vowel specification part 104 outputs the recognized vowel to the vowel information output part 105. Vowel information output part 105 is a part for outputting information specifying a vowel in conformity with an output object. As this output object there may be mentioned a recognition algorithm, a speaker or a display.

In the aforesaid embodiment, one pays attention to the difference between a time window set at a long time period and a child time window set at a short time period. That is, one can grasp the tendency of a myoelectric signal over a long time period with the time window set at a long time period and, conversely, the tendency of a myoelectric signal over a short time period with the child time window set at a short time period. Therefore, a child time window is suitable to grasp the timing of a vocalization operation, and a time window is suitable to grasp the tendency before and after that timing.

In this embodiment, two kinds of time window are used, but it is possible to recognize a vowel by the use of one kind of time window. For example, in the case of using only the aforesaid child time window set at a short time period, it is possible to use an average of a plurality of child time windows, instead of the aforesaid time window set at a long time period.

Figure 10:
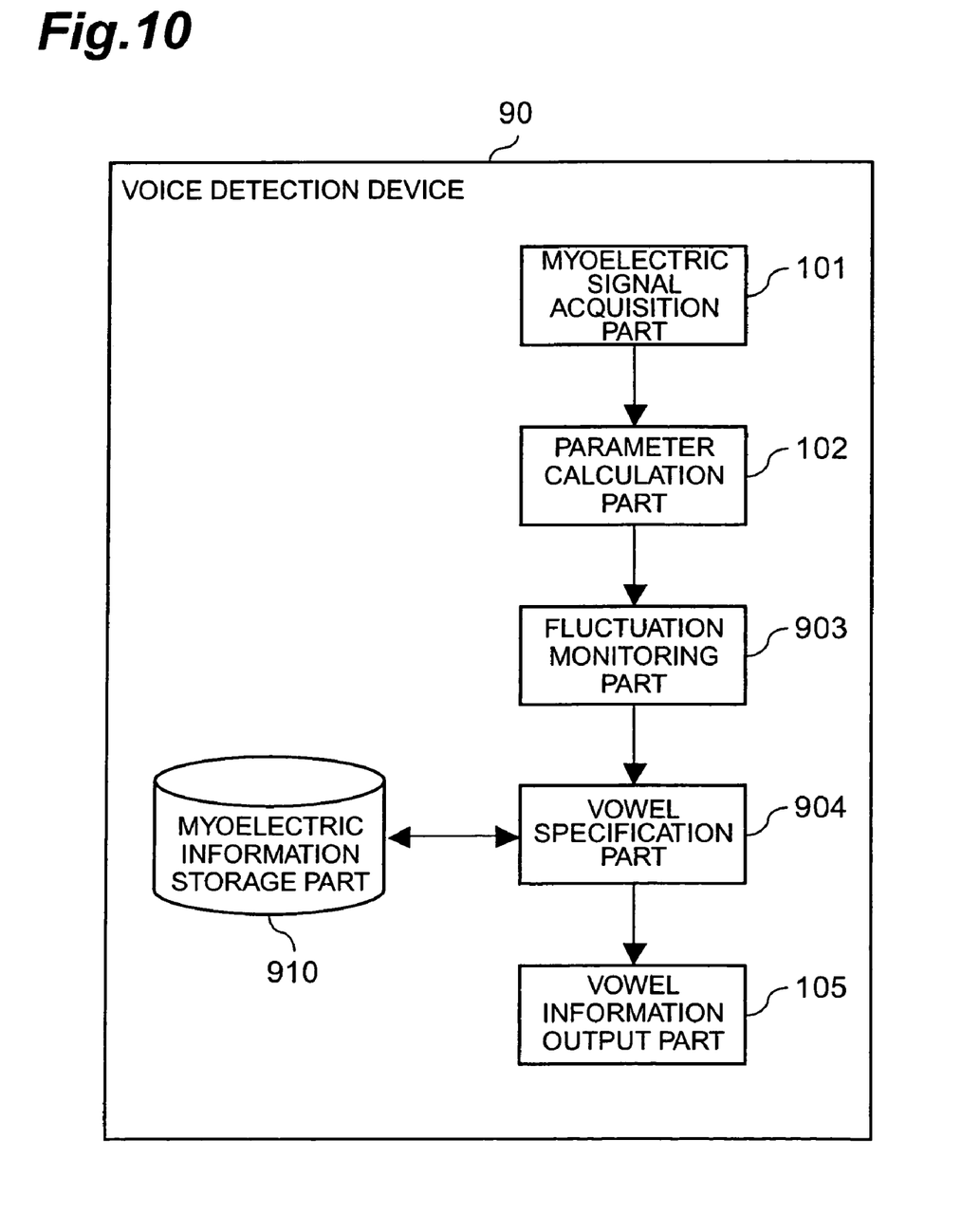
FIG. 10 is a view showing the structure of a variation of the voice detection device according to the embodiment of this invention.

Further, it is possible to use a voice detection device 90 being a partly modified voice detection device 10. The structure of the voice detection device 90 is shown in FIG. 10, and the operation of the voice detection device 90 is shown in a flow chart of FIG. 12. Voice detection device 90 is physically so constituted as to comprise part such as electrodes for acquiring myoelectric signals, CPU and memories. Voice detection device 90 comprises, as functional components, a myoelectric signal acquisition part 101 (myoelectric signal acquisition means), a parameter calculation part 102 (parameter calculation means), a fluctuation monitoring part 903 (fluctuation monitoring means), a vowel specification part 904 (vowel specification means), a vowel information output part 105, and a myoelectric information storage part 910 (myoelectric information storage means). In the following, each component is described. But since a myoelectric signal acquisition part 102, a parameter calculation part 102 and a vowel information output part 105 are the same as in the voice detection device 10, their being described is omitted.

Figure 12:
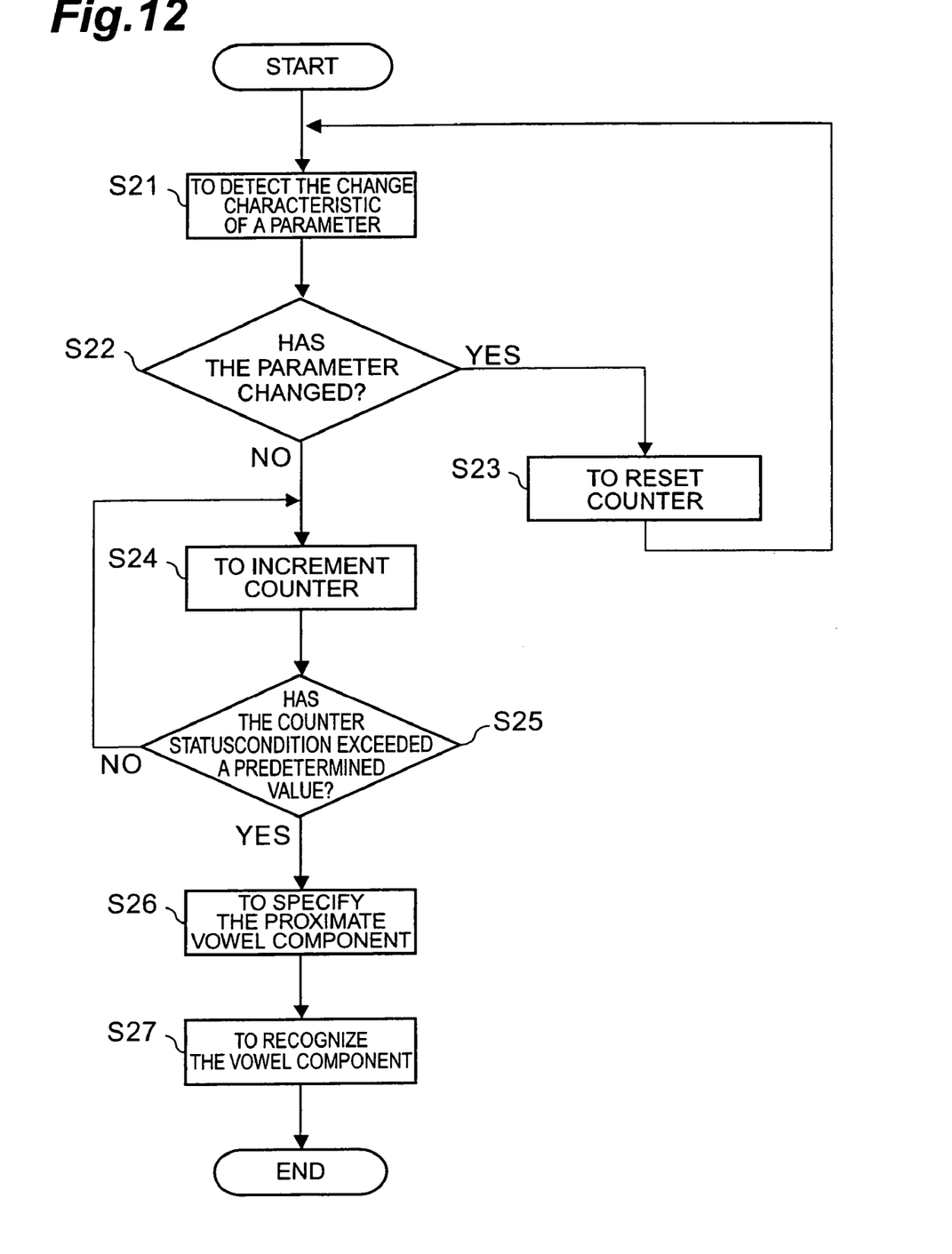
FIG. 12 is a view illustrating the operation of the voice detection device of FIG. 10.

Fluctuation monitoring part 903 is apart monitoring whether or not the parameters output from the parameter calculation part 102 fluctuate over a predetermined time. Fluctuation monitoring part 903 detects the change characteristic of the parameters (step S21). This change characteristic indicates whether or not a parameter has fluctuated. Fluctuation monitoring part 903 determines whether or not a parameter has fluctuated (step S22). Fluctuation monitoring part 903 determines that a parameter has not fluctuated if the parameter's value remains within the range of 50-150% as compared with an immediately preceding parameter, and determines that a parameter has fluctuated if the parameter's value has surpassed that range. If the parameter has fluctuated, the fluctuation monitoring part 903 resets a counter (step S23). If the parameter has not fluctuated, the fluctuation monitoring part 903 increments a counter (step S24). Fluctuation monitoring part 903 determines whether or not the counter condition has exceeded a predetermined threshold (step s25). If this counter condition has exceeded a predetermined threshold, the fluctuation monitoring part 903 outputs the parameters output from the parameter calculation part 102 to the vowel specification part 904. In these steps S24-S25, the time window in which the fluctuation monitoring part 903 monitors the fluctuations is set at a very short time period, at 20-50 ms in this embodiment. Thus, if the information indicating the excess beyond a predetermined time period does not come in, no parameters are output to the vowel specification part 904. Therefore, it is possible to prevent accidental noise's being mixed into.

Figure 11A:
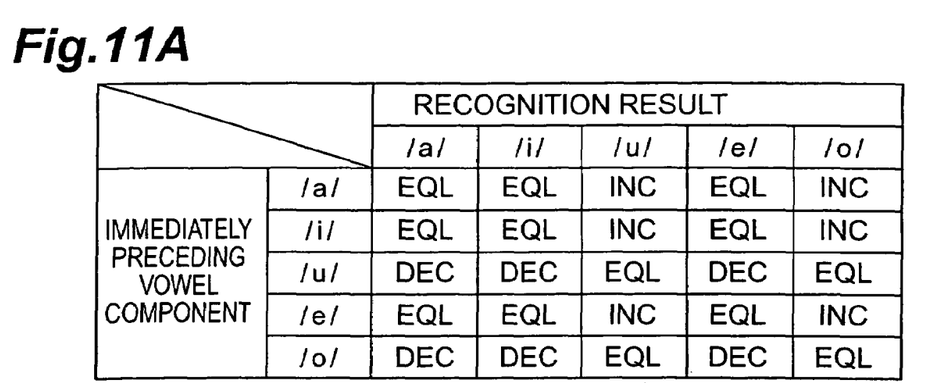
FIG. 11A is a view showing an example of the information stored in the myoelectric information storage part of FIG. 10.
Figure 11B:
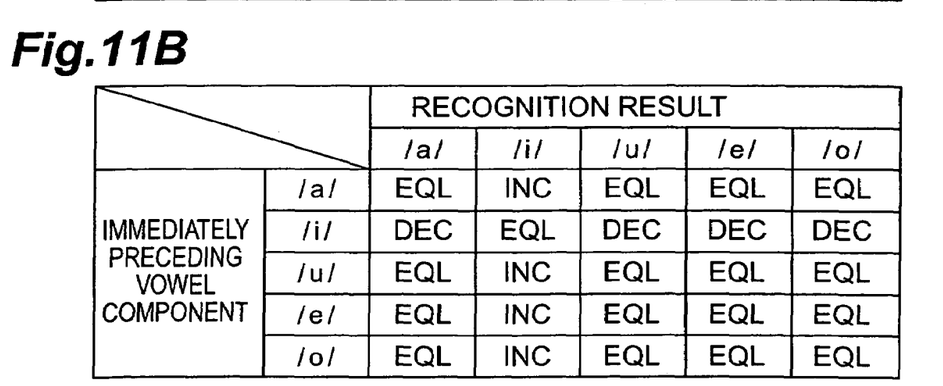
FIG. 11B is a view showing an example of the information stored in the myoelectric information storage part of FIG. 10.
Figure 11C:
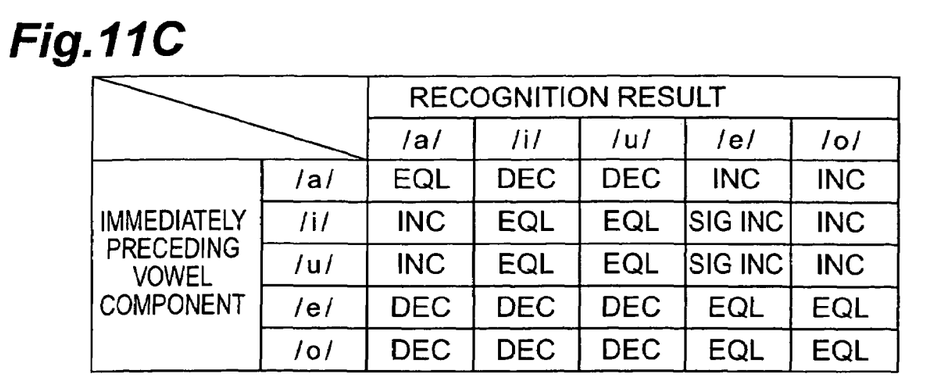
FIG. 11C is a view showing an example of the information stored in the myoelectric information storage part of FIG. 10.

Vowel specification part 904 is a part for specifying a vowel corresponding to a vocalization operation based on the monitoring result of the fluctuation monitoring part 903 and the parameters. Vowel specification part 904 specifies a proximate vowel component (step S26). In this embodiment, a vowel component being vocalized immediately before has already been recognized, and the vowel production recognition part 103 specifies this already recognized vowel component as the one being vocalized proximately. As the procedure to recognize a vowel component being vocalized immediately before, it is possible to use a known voice recognition procedure. Further, for example, one may make it a rule to ask a user to initially pronounce "ah" and have the vocalized vowel component recognized. Vowel specification part 904 specifies a vowel component based on this specified proximate vowel component and the information stored in the myoelectric signal storage part 910 (step S27). FIGS. 11A-1C show an example of the information stored in the myoelectric information storage part 910. FIG. 11A shows the correspondence between the immediately preceding vowel component at orbicularis oris and the change characteristic, FIG. 11B shows the correspondence between the immediately preceding vowel component at zygomaticus major and the change characteristic, and FIG. 11C shows the correspondence between the immediately preceding vowel component at digastricus and the change characteristic. For example, if the immediately preceding vowel component is "/a/", and the change characteristic of each channel is "equal" at orbicularis oris, "increase" at zygomaticus major and "decrease" at digastricus, then it recognizes the vocalized vowel to be "/i/", based on the information shown in FIG. 11C. The point different from the subject matter described with reference to FIG. 9A-9C is that, in order to admit the case where the immediately preceding vowel component and the recognition result are the same, the relevant part is now deemed to be "equal". Here it is assumed that a "significant increase" means the case of an increase not less than 200% from the level of the preceding condition, an "increase" means the case of an increase not less than 50% to below 200% from the level of the preceding condition, "equal" means a change amount less than ±50% from the level of the preceding condition, and a "decrease" means a decrease not less than 50% from the level of the preceding condition.

What is claimed is:

1. A voice detection device comprising:
myoelectric signal acquisition means for acquiring, from a plurality of regions, myoelectric signals generated at a time of a vocalization operation;
parameter calculation means for calculating parameters, each corresponding to a predetermined time period, based on a potential of said myoelectric signals which are acquired by said myoelectric signal acquisition means;
vowel vocalization recognition means for calculating an amount of temporal change which specifies a degree of change between a parameter calculated by said parameter calculation means at a proximate time and a parameter calculated by said parameter calculation means at a previous time, and for specifying a timing of a vowel changing upon a comparison of said amount of temporal change and a predetermined threshold; and
vowel specification means for detecting a change characteristic of said parameters before and after said timing of a vowel changing, based on said timing of said vowel changing which is specified by said vowel vocalization recognition means and said parameters which are calculated by said parameter calculation means, and for specifying a vowel corresponding to said vocalization operation, based on said change characteristic.

2. A voice detection device according to claim 1, further comprising myoelectric information storage means for storing a combination of vowels before and after said timing of said vowel changing and said change characteristic in a state where both are related to each other in a channel, wherein said vowel specification means specifies the combination of vowels stored in said myoelectric information storage means, based on said change characteristic so as to specify a vowel corresponding to said vocalization operation.

3. A voice detection device according to claim 1, wherein said parameters include a first parameter corresponding to a first time window and a second parameter corresponding to a second time window, which is set with a shorter time period than that of said first time window;

said vowel vocalization recognition means specifies the vocalization operation timing, based on said second parameter; and said vowel specification means specifies said vowel, based on said first parameter.

4. A voice detection device according to claim 1, wherein said parameters are one of root means squared (RMS) values, average rectification values (ARV), and integral electromyogram (IEMG) values.

5. A voice detection device comprising:

myoelectric signal acquisition means for acquiring, from a plurality of regions, myoelectric signals generated at a time of a vocalization operation;

parameter calculation means for calculating parameters, each corresponding to a predetermined time period, based on a potential of said myoelectric signals which are acquired by said myoelectric signal acquisition means;

fluctuation monitering means for detecting fluctuations of said parameters which are calculated by said parameter calculation means for each predetermined time period, for monitoring whether or not parameters which are calculated later than said detected fluctuations fluctuate over a predetermined time period, and for outputting said parameters which are calculated by said parameter calculation means if said parameters which are calculated later than said detected fluctuations have not fluctuated over said predetermined time period; and vowel specification means for specifying a vowel corresponding to said vocalization operation, based on a change characteristic acquired from said parameters outputted by said fluctuation monitoring means.

6. A voice detection device according to claim 5, further comprising myoelectric information storage means for storing a combination of vowels before and after said timing of said vowel changing and said change characteristic in a state where both are related to each other in a channel, wherein said vowel specification means specifies the combination of vowels stored in said myoelectric information storage means, based on said change characteristic so as to specify a vowel corresponding to said vocalization operation.

7. A voice detection device according to claim 5, wherein said parameters are one of root means squared (RMS) values, average rectification values (ARV), and integral electromyogram (IEMG) values.

8. A voice detection device comprising:

a myoelectric signal acquisition unit configured to acquire, from a plurality of regions, myoelectric signals generated at a time of a vocalization operation;

a parameter calculation unit configured to calculate parameters, each associated with an activity amount of muscles for a predetermined time period, based on a potential of said myoclectric signals which are acquired by said myoelectric signal acquisition unit;

a vowel vocalization recognition unit configured to calculate an amount of temporal change which specifies the degree of change between a parameter calculated by said parameter calculation means at a proximate time and a parameter calculated by said parameter calculation means at a previous time, and to specify a timing of a vowel changing upon a comparison of said amount of temporal change and a predetermined threshold; and a vowel specification unit configured to detect a change characteristic of said parameters before and after said timing of a vowel changing, based on said timing of a vowel changing which is specified by said vowel vocalization recognition unit and said parameters which are calculated by said parameter calculation unit, and to specify a vowel corresponding to said vocalization operation, based on said change characteristic.

9. A voice detection device comprising:

a myoelectric signal acquisition unit configured to acquire, from a plurality of regions, myoelectric signals generated at a time of a vocalization operation;

a parameter calculation unit configured to calculate parameters, each associated with an activity amount of muscles for a predetermined time period, based on a potential of said myoelectric signals which are acquired by said myoelectric signal acquisition unit;

a fluctuation monitoring unit configured to detect fluctuations of said parameters which are calculated by said parameter calculation unit, to monitor whether or not parameters which are calculated later than said parameter detected fluctuations fluctuate over a predetermined time period, and to output said parameters which are calculated by said parameter calculation unit if said parameters which are calculated later than said detected fluctuations have not fluctuated over said predetermined time period; and a vowel specification unit configured to specify a vowel corresponding to said vocalization operation, based on an immediately preceding vowel component and a change characteristic acquired from said parameters output by said fluctuation monitoring unit.

* * * * *